(12) United States Patent
Mordvinov et al.

(10) Patent No.: US 8,122,050 B2
(45) Date of Patent: Feb. 21, 2012

(54) QUERY PROCESSING VISUALIZATION SYSTEM AND METHOD OF VISUALIZING QUERY PROCESSING

(75) Inventors: Vladimir Mordvinov, Nepean (CA); Soufiane Azizi, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 541 days.

(21) Appl. No.: 12/104,108

(22) Filed: Apr. 16, 2008

(65) Prior Publication Data

US 2009/0265324 A1 Oct. 22, 2009

(51) Int. Cl.
*G06F 17/30* (2006.01)

(52) U.S. Cl. ........................................ 707/769; 707/773

(58) Field of Classification Search ........... 707/999.003, 707/999.004, 769, 773
See application file for complete search history.

(56) References Cited

U.S. PATENT DOCUMENTS

| | | | | |
|---|---|---|---|---|
| 5,375,125 | A * | 12/1994 | Oshima et al. | 714/38 |
| 6,557,011 | B1 * | 4/2003 | Sevitsky et al. | 1/1 |
| 6,654,948 | B1 * | 11/2003 | Konuru et al. | 717/127 |
| 2006/0271884 | A1 * | 11/2006 | Hurst | 715/854 |
| 2006/0294076 | A1 | 12/2006 | Mordvinov et al. | |

OTHER PUBLICATIONS

International Search Report and Written Opinion from PCT/EP2009/054425 mailed Jul. 21, 2009 (9 pages).

G. Kapfhammer, "A Comprehensive Framework for Testing Database-Centric Software Applications," PhD Thesis, University of Pittsburgh, Apr. 2007, pp. 1-253 (XP002534200).

Mike Brayshaw, "An Architecture for Visualizing the Execution of Parallel Logic Programs," Proc. of the Twelfth International Conference on Artificial Intelligence, vol. 2, Aug. 1991, pp. 870-876 (XP002534201).

DePauw et al., "Execution Patterns in Object-Oriented Visualization," Proceedings of the Fourth Usenix Conference on Object-Oriented Technologies and Systems, 1998, pp. 219-234 (XP002534202).

* cited by examiner

*Primary Examiner* — Apu Mofiz
*Assistant Examiner* — Monica Pyo
(74) *Attorney, Agent, or Firm* — Shumaker & Sieffert, P.A.

(57) ABSTRACT

A query processing visualization system comprises a visualization module. The visualization module visualizes logging information of query processing events occurring during processing of a client query requesting data from one or more data sources by analyzing the logging information to identify dependency of the query processing events, formatting visual presentation components representing the logging information in a hierarchy to reflect the dependency of the query processing events, and presenting the visual presentation components in the context of the hierarchy of the visual components as formatted.

25 Claims, 11 Drawing Sheets

```
<QFSScript>
<QFSDispatcher method="GetSession">
<parm type="return"><QFSSession id="S3"/></parm>
</QFSDispatcher>

<QFSSession _provider="QFS" id="S3" method="DoRequest1" reqID="r3">
<parm type="input"> *COMMAND1*</parm>

<QFSDispatcher _provider="CoordinationPlanner" id="CoordinationPlanner" method="CreateConnection"
reqID="r3" > ...
<QFSConnection _provider="CoordinationPlanner" id="C10" method="ConnectionConnect" reqID="r3"
thread="5248" time="2008-02-17 21:58:07.265"> ...
<QFSConnection _provider="CoordinationPlanner" id="C10" method="ConnectionNewQuery"
thread="5248" time="2008-02-17 21:58:07.265"> ...
<QFSQuery _provider="CoordinationPlanner" id="Q29" method="QuerySetCompleteRequest"
thread="5248" time="2008-02-17 21:58:07.312"> ...
<QFSQuery _provider="CoordinationPlanner" id="Q29" method="QueryExecute1" reqID="r3"
thread="5248" time="2008-02-17 21:58:07.312"> ...

<parm type="output">
        <response> *RESPONSE1* </response>
</parm>
<parm type="return">
        <QFSMasterDataset id="Mds22"/>
</parm>
<info timeElapsed="00:00:00.797"/>
</QFSSession>
        ...
</QFSScript>
```

Figure 7

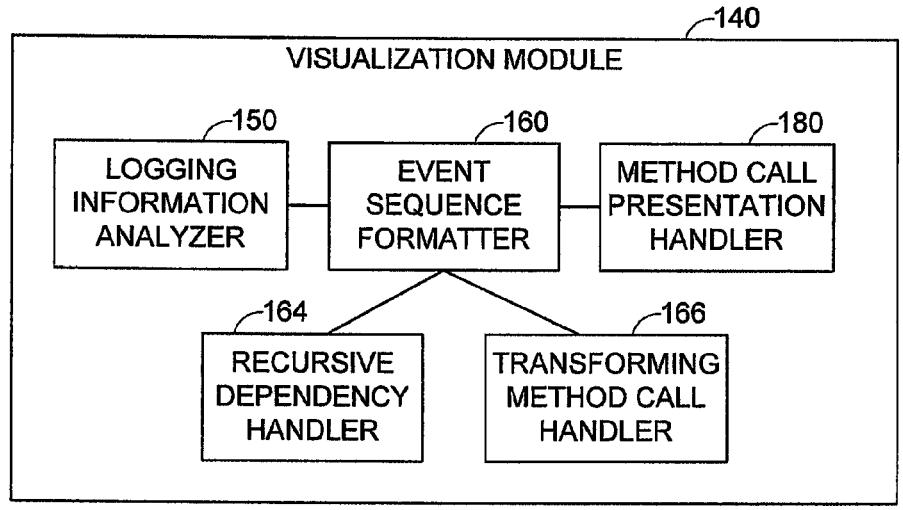

Figure 8

```
         QFSDispatcher::GetSession [+return]
(-)  QFS QFSSession::DoRequest1 00:00:00.797 [+input] [+output] [+return]
         CoordinationPlanner QFSDispatcher::CreateConnection [+return]
         CoordinationPlanner QFSConnection::ConnectionSetCompleteRequest [+input]
         CoordinationPlanner QFSConnection::ConnectionConnect [+input]
         CoordinationPlanner QFSConnection::ConnectionNewQuery [+return]
         CoordinationPlanner QFSQuery::QuerySetCompleteRequest [+input]
(-)      CoordinationPlanner QFSQuery::QueryExecute1 00:00:00.750 [+input] [+output] [+return]
            CoordinationPlanner QFSQuery::CoercionResult [+input] [+output]
            ZeroSuppressProvider QFSDispatcher::CreateConnection [+return]
            ZeroSuppressProvider QFSConnection::ConnectionSetCompleteRequest [+input]
            ZeroSuppressProvider QFSConnection::ConnectionConnect [+input]
            ZeroSuppressProvider QFSConnection::ConnectionNewQuery [+return]
            ZeroSuppressProvider QFSQuery::QueryPrepare 00:00:00.015 [+input] [+output]
            ZeroSuppressProvider QFSQuery::QueryClose
            ZeroSuppressProvider QFSQuery::DeleteQuery
            RefinerProvider QFSDispatcher::CreateConnection [+return]
            RefinerProvider QFSConnection::ConnectionSetCompleteRequest [+input]
            RefinerProvider QFSConnection::ConnectionConnect [+input]
            RefinerProvider QFSConnection::ConnectionNewQuery [+return]
            RefinerProvider QFSQuery::QueryPrepare 00:00:00.016 [+input] [+output]
            RefinerProvider QFSQuery::QueryClose
```

Figure 9

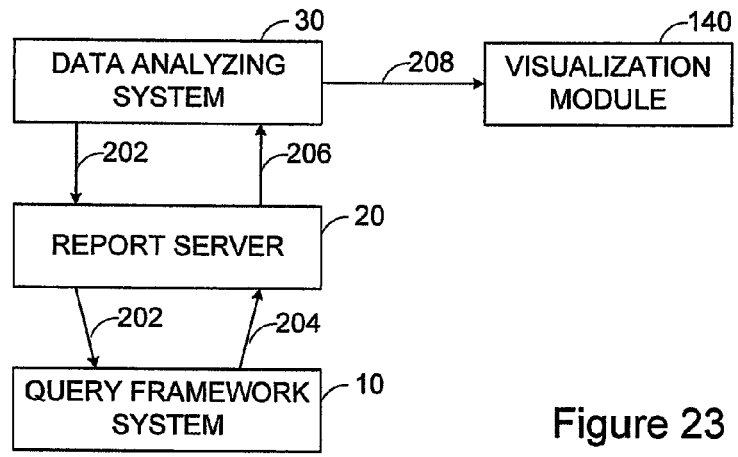

Figure 23

```
<SOAP-ENV:Envelope>
    ...
    <SOAP-ENV:Body>
        <rns1:validateSpecification xmlns:rns1="http://developer.cognos.com/schemas/reportService/1">
            <bus:specification xsi:type="bus:reportServiceReportSpecification"> ...
            <bus:options xsi:type="SOAP-ENC:Array" SOAP-ENC:arrayType="bus:option[4]">
                <item xsi:type="bus:validateOptionValidateSeverity">
                    <bus:name xsi:type="bus:validateOptionEnum">severity</bus:name>
                    <bus:value xsi:type="bus:validateSeverityEnum">information</bus:value>
                </item>
                <item xsi:type="bus:validateOptionRequestProperty">
                    <bus:name xsi:type="bus:validateOptionEnum">requestProperty</bus:name>
                    <bus:value xsi:type="bus:validateSeverityEnum">ExecutionPlan</bus:value>
                </item>
            </bus:options>
        </rns1:validateSpecification>
    </SOAP-ENV:Body>
</SOAP-ENV:Envelope>
```

Figure 24

```
<qs:command>
    ...
    <validate returnParameterValues="false">
        <property name="forMissingMembers" value="true"/>
        <queryFeedback severityLevel="information">
            <property name="CognosCommandText" queryName="Query1.0"/>
            <property name="nativeCommandText" queryName="Query1.0"/>
            <property name="nativeCommandType" queryName="Query1.0"/>
            <property name="catalog" queryName="Query1.0"/>
            <property name="connections" queryName="Query1.0"/>
        </queryFeedback>
```

Figure 25

```
<qs:command report="" startTime="2008-02-25T03:28:43.281Z">
    ...
    <validate returnParameterValues="false">
        <property name="forMissingMembers" value="true"/>
        <queryFeedback>
            <property name="QFExecutionPlan" queryName="Query1.0"/>
        </queryFeedback>
```

Figure 26

```
<SOAP-ENV:Envelope>
    <SOAP-ENV:Body>
        <rns1:validateSpecificationResponse xmlns:rns1="http://developer.cognos.com/schemas/reportService/1">
    <SOAP-ENV:Body>
        <rns1:validateSpecificationResponse xmlns:rns1="http://developer.cognos.com/schemas/reportService/1">
            <bus:result xsi:type="bus:asynchReply">
                <bus:details xsi:type="SOAP-ENC:Array" SOAP-ENC:arrayType="bus:asynchDetail[1]">
                    <item xsi:type="bus:asynchDetailReportValidation"> ...
                        <bus:queryInfo xsi:type="bus:xmlEncodedXML"> QUERY INFO </>
```

Figure 27

```
<queryResults>
    <queryResult queryName="Query1" qrdName = "Query1.0">
        <queryFeedbackResult>
            <property name="QFExecutionPlan" queryName="Query1.0">...</>
```

Figure 28

QUERY PROCESSING VISUALIZATION SYSTEM AND METHOD OF VISUALIZING QUERY PROCESSING

FIELD OF INVENTION

The present invention relates to a query processing visualization system and method of visualizing query processing.

BACKGROUND OF THE INVENTION

Many organizations use data stores for storing business data, such as financial data and operational data. In order to assist business users to examine their data, various data analyzing applications are proposed. Those data analyzing applications provide various views or reports of data to users. The data analyzing applications have query engines that access the data stores to obtain desired data. Some data analyzing applications have Online Analytical Processing (OLAP) engines to provide multidimensional views of data.

Those existing query engines and OLAP engines use components of the engines to obtain desired data, and do not allow for external components to be involved into the internal logic of query processing. Thus, these engines cannot reuse or share functionality with other components.

In order to facilitate reuse of the planning logic compiling all query operation provider actions in a single execution plan, United States patent application publication No. US 2006/0294076 A1 published Dec. 28, 2006, which is hereby incorporated by reference, proposes use of a query framework system that processes a query having a coordination planner and multiple query service providers. The query framework system processes a query and generates a query execution plan, along which the query is executed using relevant query service providers. When issues arise during the query execution, in order to debug the issues, a user needs to understand the query processing details.

Therefore, it is desirable to provide a tool that provides visual representation of the query processing which aids users to attend to query processing issues.

SUMMARY OF THE INVENTION

The present invention uses a query processing visualization interface that can provide specifically formatted views of query processing.

It is an object of the invention to provide an improved query processing visualization system and method of visualizing query processing.

According to an aspect of the present invention there is provided a query processing visualization system comprising a visualization module for visualizing logging information of query processing events occurring during processing of a client query requesting data from one or more data sources. The visualization module comprises a logging information analyzer, an event sequence formatter and a method call presentation handler. The logging information analyzer is provided for analyzing the logging information to identify dependency of the query processing events. The event sequence formatter is provided for formatting visual presentation components representing the logging information in a hierarchy to reflect the dependency of the query processing events. The method call presentation handler is provided for presenting visual presentation components in a context of the hierarchy of the visual components as formatted by the event sequence formatter.

According to another aspect of the present invention there is provided a method of visualizing query processing. The method comprises the steps of analyzing logging information of query processing events occurring during processing of a client query requesting data from one or more data sources so as to identify dependency of the query processing events, formatting visual presentation components representing the logging information in a hierarchy to reflect the dependency of the query processing events, and presenting the visual presentation components in a context of the hierarchy of the visual components as formatted by the formatting step.

According to another aspect of the present invention there is provided a computer readable medium containing computer executable instructions that can be read and executed by a computer for caring out a method of visualizing query processing. The method comprises the steps of analyzing logging information of query processing events occurring during processing of a client query requesting data from one or more data sources so as to identify dependency of the query processing events, formatting visual presentation components representing the logging information in a hierarchy to reflect the dependency of the query processing events, and presenting the visual presentation components in a context of the hierarchy of the visual components as formatted by the formatting step.

This summary of the invention does not necessarily describe all features of the invention.

BRIEF DESCRIPTION OF THE DRAWINGS

These and other features of the invention will become more apparent from the following description in which reference is made to the appended drawings wherein:

FIG. 7 is an example of a query processing log;

FIG. 8 is a diagram showing an embodiment of a visualization module of the query processing visualization system;

FIG. 9 is an example of a high level representation of a formatted query processing log;

FIG. 23 is a diagram showing an example of a flow of a query execution validation request;

FIG. 24 is an example of a validation request;

FIG. 25 is an example of a translated validation request;

FIG. 26 is an example of a validation request command report;

FIG. 27 is an example of a validation request response; and

FIG. 28 is an example of a query information string.

DETAILED DESCRIPTION

Figure 1:
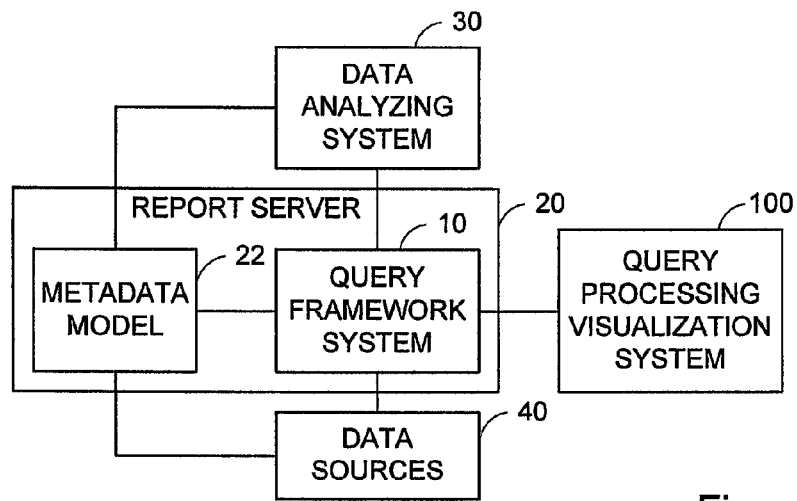
FIG. 1 is a block diagram showing a query processing visualization system in accordance with an embodiment of the present invention.

Referring to FIG. 1, a query processing visualization system 100 in accordance with an embodiment of the application is described. The query processing visualization system 100 is suitably used in an open system of loosely coupled query processing components. In the embodiment shown in FIG. 1, the query processing visualization system 100 works with a query framework system 10 that is used in a report server 20. The query framework system 10 is provided to receive user queries from a data analyzing system 30 and process the received user requests to retrieve requested data from one or more data sources 40, using a metadata model 22. These systems may be suitably used in server-client environments.

The query analyzing system 30 is an application system that provides various views of data in the data sources 40 to allow users to analyze the data. When a user requests a view of data, the query analyzing system 20 generates a user request. To generate user requests, the query analyzing system 20 may use a metadata model 22 that contains metadata of the data sources 40. The user request is in a query language that the query analyzing system 20 uses to issue the user request.

The query framework system 10 intercepts user requests generated by the data analyzing system 30. It processes and executes the user requests to retrieve desired data from the data sources 40.

Figure 2:
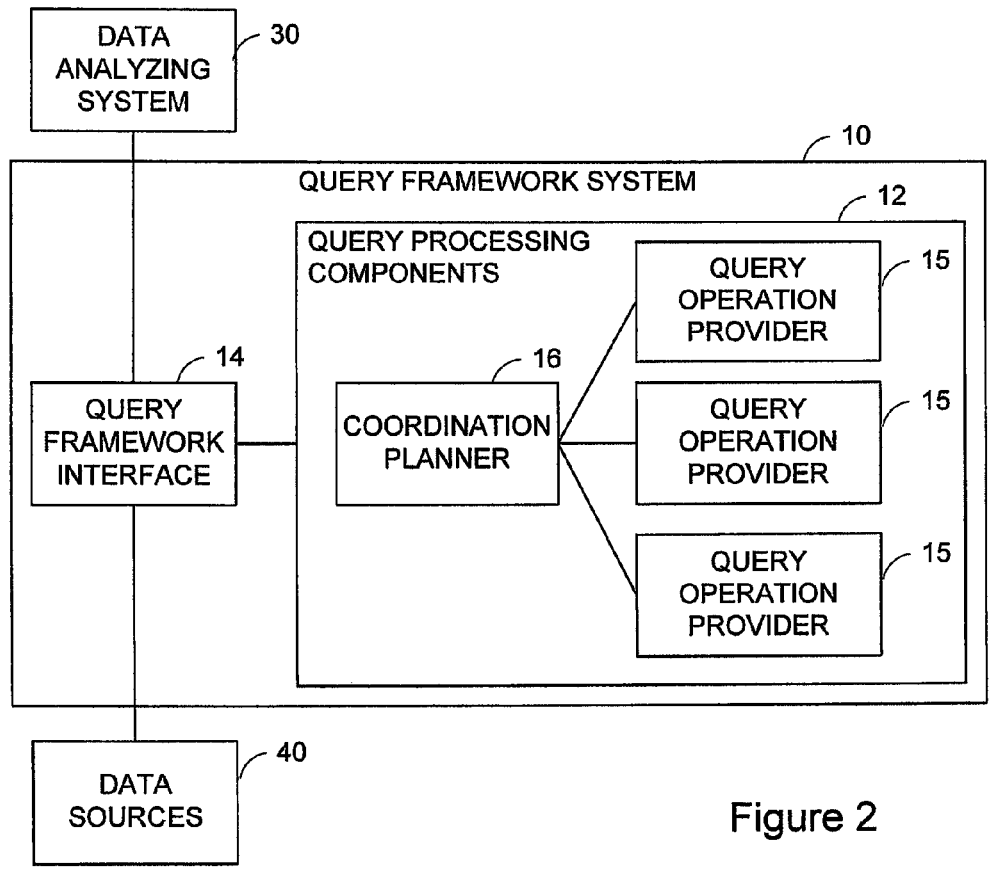
FIG. 2 is a block diagram showing an example of a query framework system.

As shown in FIG. 2, the query framework system 10 has multiple query processing components 12. Query processing components 12 include a set of query operation providers 15 and a coordination planner 16. Query processing components 12 share a common interface 14 and a common query language of the query framework system 10. Query processing components 12 are pluggable.

Each query operation provider 15 is capable of performing a specific operation on queries, as further exemplified below. In FIG. 2, three query operation providers 15 are shown for the purpose of illustration. There may be more or fewer query operation providers in the query framework system 10.

Figure 3:
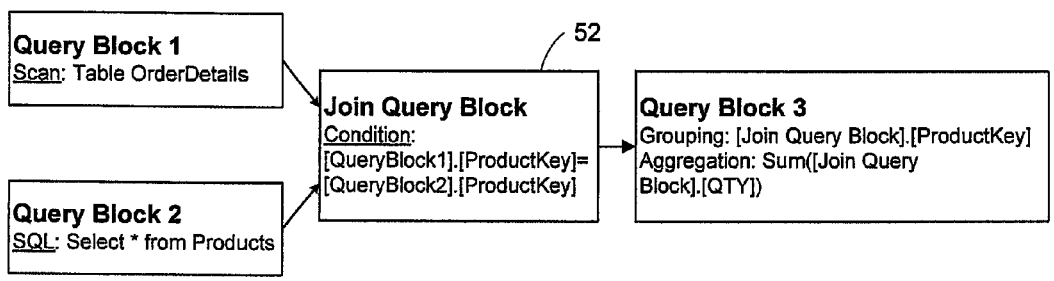
FIG. 3 is a diagram showing an example of a query tree.

The query framework system 10 uses a query framework (QF) query 50 as exemplified in FIG. 3. A QF query 50 plays the role of a query specification that the query operation providers 15 use to communicate to each other and to the coordination planner 16 within the query framework system 10. The QF query definition is an extension of the user request specification defined by the data analyzing system 30. This extension is applicable to any query language that can express a whole request conceptually as a tree 50 of query blocks 52 also called here macro operations. The results of child query blocks feed the operation of the parent query block. Structured Query Language (SQL) is the query language of this kind where query blocks are expressed with the SELECT statements. Another example is the Cognos specification of the BIQuery used in the ReportNet™ product. FIG. 3 shows an example of a QF query 50 viewed conceptually as a tree 50 of query blocks 52 or macro query operations.

The query framework system 10 divides the query processing into two phases: query planning or preparation phase and a query execution phase. The final result of the query planning process phase is a query execution plan, which is executed during the query execution process phase. During the query preparation phase, the coordination planner 16 interacts with query operation providers 15 in order to identify and plan the operations associated with each provider, and to determine the sequence of these operations expressed in an execution plan. The coordination planner 16 may use one or more query operation providers 15 during the query preparation phase. During the query execution phase, the coordination planner 16 distributes the query operations to associated query operation providers 15, invoking the query operation providers 15 in accordance with the sequence expressed by the execution plan determined at the preparation phase.

Figure 4:
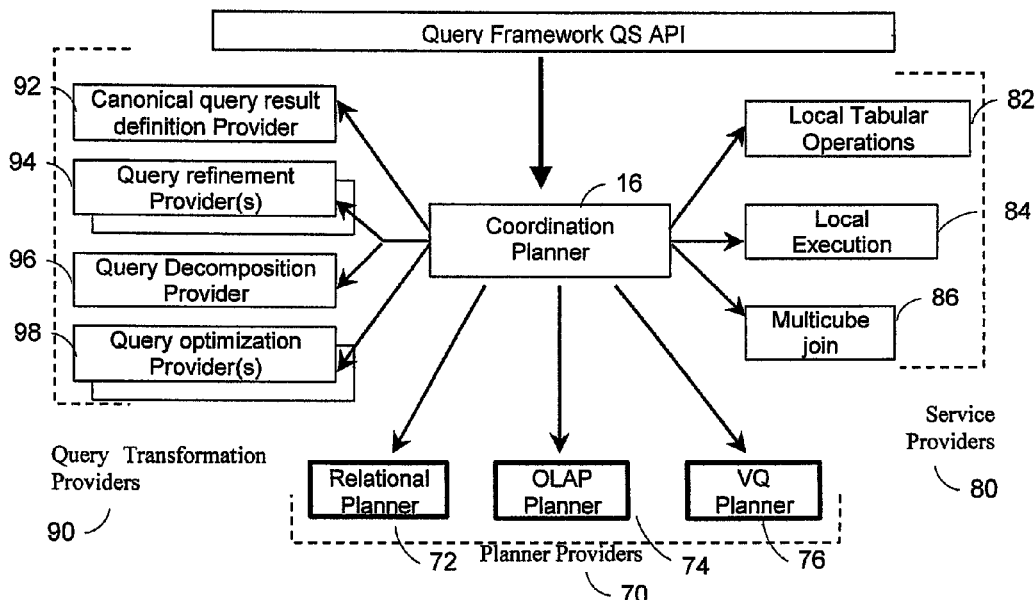
FIG. 4 is a diagram showing an example of a query framework system.

FIG. 4 shows an example of the query framework system 10 having three types of query operation providers 15: planner providers 70, service providers 80 and query transformation providers 90. Query planner providers 70 replace the received user request with a provider query that has no children query blocks and hence do not need input data streams during the execution phase. Planner providers 70 support execution of a provider query without accepting incoming data streams. In this example, the query framework system 10 has relational planner query provider (RQP) 72, OLAP planner query provider (OQP) 74, and vendor query (VQ) planner query provider 76. Service providers 80 provide local query operations, and generate provider queries on top of query blocks associated with other components. In this example, the query framework system 10 has a local tabular operation provider 82, local execution provider 84 and a multicube join provider 86. Query transformation providers 90 are responsible for preprocessing of a QF query for the consumption of the transformed query by other query operation providers. In this example, the query framework system 10 has a canonical query result definition provider 92, query refinement provider 94, query decomposition provider 96 and query optimization provider 98.

The query processing visualization system 100 provides visualization of the query processing. The query processing includes the query planning and query execution.

Figure 5:
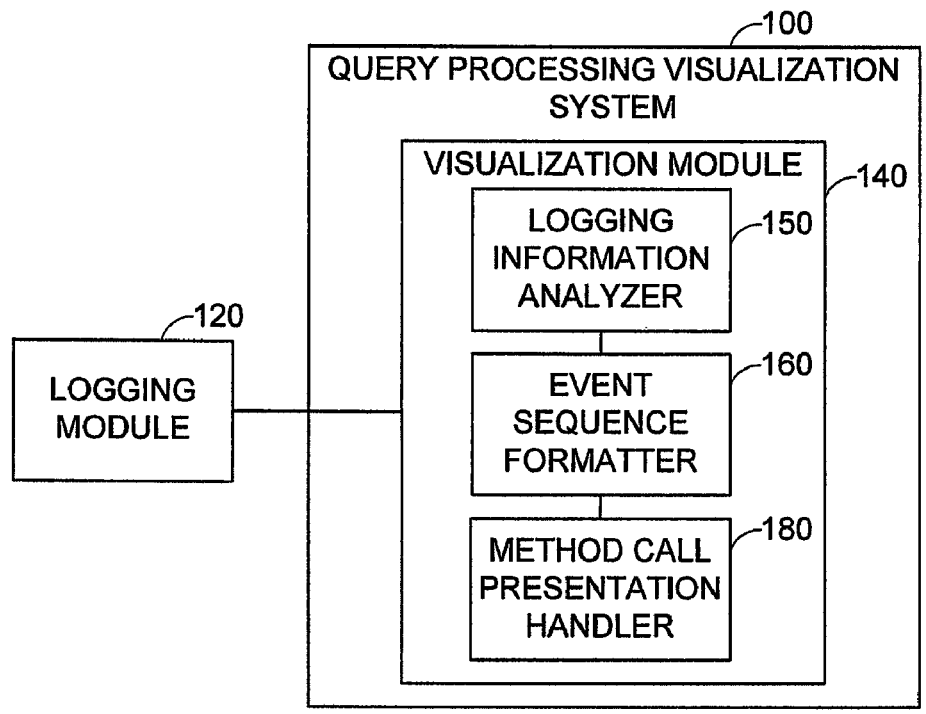
FIG. 5 is a diagram showing an embodiment of the query process visualization system.

As shown in FIG. 5, the query processing visualization system 100 comprises a visualization module 140. In this embodiment, the query processing visualization system 100 works with a logging module 120 that is provided outside the query processing visualization system 100. In a different embodiment, the logging module 120 may be part of the query processing visualization system 100.

The logging module 120 obtains logging information of query processing events occurring during processing of a client query requesting data. In an embodiment where the query framework system 10 has a logging functionality and a logging information storage storing logging information, the logging module 120 may obtain the logging information from the logging information storage of the query framework system 10.

Figure 6:
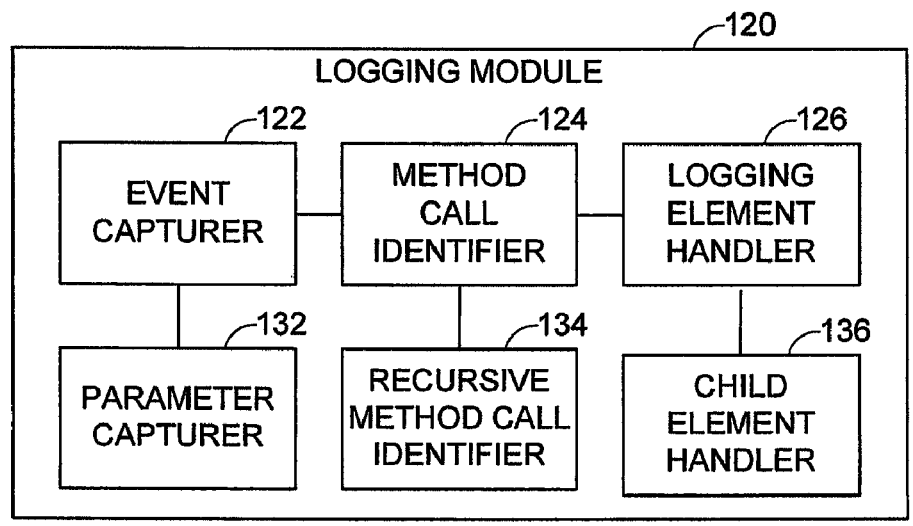
FIG. 6 is a diagram showing an embodiment of a logging module of the query processing visualization system.

FIG. 6 shows an embodiment where the logging module 120 provides logging functionality. In this embodiment, the logging module 120 has an event capturer 122, a method call identifier 124 and a logging element handler 126. The event capture 122 captures query processing events occurring in the query framework system 10. The event capturer 122 has a parameter capturer 132 for capturing logging information of parameters of method calls. The method call identifier 124 identifies main events captured as calls to interface methods. The method call identifier 124 has a recursive method call identifier 134 for identifying recursive method calls. The logging element handler 126 logs in Query Framework log files to reflect the events captured. The logging element handler 126 has a child element handler 136 for handling logging in children elements.

The structure of the log is driven by the sequence events occurring in the query framework system 10. The logging element handler 126 writes some information that should be logged into the log right away, so that logging does not require any information to be kept in memory that waits to be logged at the right time. On the other hand, the logging element handler 126 writes some information, e.g., the content of method output parameters of a method, after the method is finished, even though the execution of the method call may lead to other events to occur in the query framework system 10 that should be logged.

In an embodiment, the logging elements handler 126 logs information in the XML format. The logging elements handler 126 logs information such that each Query Framework interface method call is represented by an XML element. The parameter capturer 132 captures input and output parameters of a method, and the child element handler 136 logs the parameters in its child elements of the method. The structure of the XML format represents the event dependency. Most calls to other Query Framework interface methods are recursive, i.e. they call other methods as part of their implementation. The recursive method call identifier 134 identifies recursive method calls, and the child element handler 136 logs the recursive method calls as children of the method element.

FIG. 7 shows an example of part of a query processing event log for a method call as logged by the logging module 120 or the query framework system 10. It is typical that even for a single call, the amount of captured log data is significant and overwhelming for a user to analyze as it is.

The visualization module 140 visualizes the information in the query processing event log. It functions as a tool that enables the top down analysis of the logging information, helps identifying the portion of the log file responsible for a given transformation, aggregates corresponding pieces of logging data (e.g., input and output parameters) together, reflects the sequence of the provider invocation during query planning and execution phases, and/or maximizes the value of the logging information.

FIG. 8 shows an embodiment of the visualization module 140 which comprises a logging information analyzer 150, an event sequence formatter 160 and a method call presentation handler 180.

The logging information analyzer 150 analyzes the logging information of the query processing events. It identifies dependency of the query processing events, or method calls. The logging information analyzer 150 can extracts information of recursive dependency of the method calls, event process information, and/or parameter information of a method call.

The event sequence formatter 160 formats visual presentation components representing the logging information in a hierarchy to reflect the dependency of the method calls. It presents visual components that represent recursively called methods as collapsible components so that the methods at a given calling depth or methods belonging to a given method call sub-tree are visually presented. The event sequence formatter 160 has a recursive dependency handler 164 for formatting the visual presentation components representing the method calls in a hierarchy that reflects the recursive dependency. The event sequence formatter may also have a handler 166 of transforming method calls that provides ability to open macro operation trees for methods that have transformed the structure of these trees. In general case, the transforming method call handler 166 may compare the content of the input parameter of the prepare call with the output parameter. If these parameters are different, the transforming method call handler 166 may use that as an indication that a transformation took place. In addition to that for optimization purposes, providers are expected to return an empty response if no transformation was applied. The transforming method call handler 166 may use those empty responses to detect indication for the visualization logic that no transformation took place. Once applied, opening of macro operation trees clearly demonstrates the logic of the query planning sequence with the sequence of QueryPrepare method calls where the visualization picks only those method calls that have actually changed the query structure and returned in the response parameter.

The method call presentation handler 180 presents components of a method call logging information in the context of the hierarchy of visual components as formatted by the event sequence formatter 160.

FIG. 9 shows an example of a high level representation of the logging information in a hierarchy reflecting the dependency of method calls. This format is suitably used to address the needs of logging data analysis. The high level representation shows only method calls. The recursive dependency of the calls of a method is reflected in the hierarchy of the visual components corresponding to the method. The visual presentation components representing recursively called methods can be collapsed or opened so that only methods at a desired calling depth are shown. Each visual presentation component representing each method is visually identified by its name, the name of container object and the name of the provider.

Figures 10, 11, 12, 13:
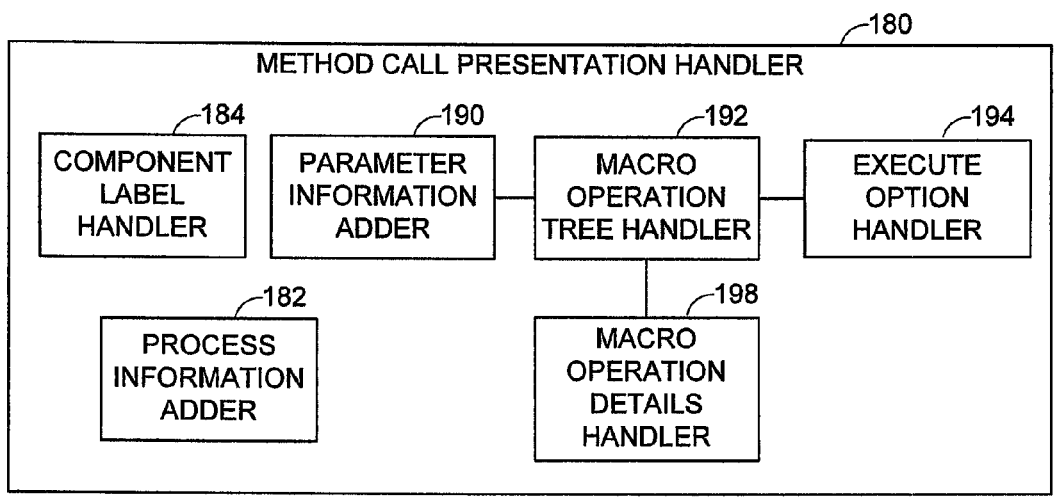
FIG. 10 is a diagram showing an embodiment of a method call presentation handler.
FIG. 11 is an example of a visualized method call.
FIG. 12 is an example of a XML representation of a parameter.
FIG. 13 is an example of a tree of macro operations.

FIG. 10 shows an embodiment of the method call presentation handler 180 in which the method call presentation handler 180 has a process information adder 182 for adding to a visual component representing a method call process information of the method call. The process information may be statistic information of processing of a method call, e.g., an elapse time and/or memory consumption of the method call. The process information adder 182 may highlight the process information in the presentation, so that it is easy to focus on this information whenever performance of the query framework system 10 is being investigated.

As shown in FIG. 10, the method call presentation handler 180 may also have a component label handler 184 for labeling a method call presentation component representing a method call by a name of method, name of container object, and/or name of a provider that provides a processing service of the method As shown in FIG. 10, the method call presentation handler 180 has a parameter information adder 190. The parameter information adder 190 adds to a visual component representing a method call an access to parameter information of the method call. The parameter information may include information of input parameters, output parameters and/or return parameters. Thus, the visualization of a call method also acts as a staring point for further analysis of its input and output parameters. The parameter information adder 182 may add an input parameter access, an output parameter access, and/or a return parameter access. The parameter information adder 182 may show access to only non-empty parameter values. When one of these accesses is selected, the associated parameter value is presented.

FIG. 11 shows an example of a presentation of a method call with an access to parameter information. This visualization of a method call acts as a starting point for further analysis of its input and output parameters. As shown in FIG. 12, clicking on a parameter type opens the values passed to a given method call. The parameters can have an XML representation.

As shown in FIG. 10, the method call presentation handler 180 may also have a macro operation tree handler 192. The macro operation tree handler 192 presents a tree of macro operations that represents a parameter containing a QF query.

A parameter value may be a QF query. As described above referring to FIG. 3, the query framework system 10 considers a query as a combination of macro operations. There are only few types of the macro operations, including operations expressed with SQL query which is the responsibility of the relational query provider (RQP), operations expressed with multidimensional expression (MDX) query which is the responsibility of OLAP query provider (OQP), operations of a dynamic cube construction which can be characterized by the structure of a cube and is the responsibility of Cube Build Provider, and number of local processing operations such as reporter mode stitching operation, zero suppression operation, and/or master-detail operation. A parameter of a method call may contain a query framework query, which is a combination of macro operations.

Using the macro operation tree handler 192, the method call presentation handler 180 can also show a parameter containing a QF query as a tree of macro operations. A tree of macro operations may include nodes representing a query result definition (QRD), query and/or provider query. FIG. 13 shows an example of a presentation of such a tree of macro operations. Nodes of the tree of macro operations include QRD and query in this example. Nodes in a tree of macro operations may be presented differently, e.g., colored differently, according to the operation type. The representation of macro operations exemplified in FIG. 13 may be chosen to be default for parameters values containing QF query as it provides an efficient high level description of the request content. This view can demonstrate the transformation of a tree of logical macro operations including QRD and queries into a tree of physical operations, i.e., provider queries.

As further shown in FIG. 10, the method call presentation handler 180 may have an execute option handler 194 that allows execution of the query framework query and for presenting a view containing query results of the execution.

Figures 14, 15:
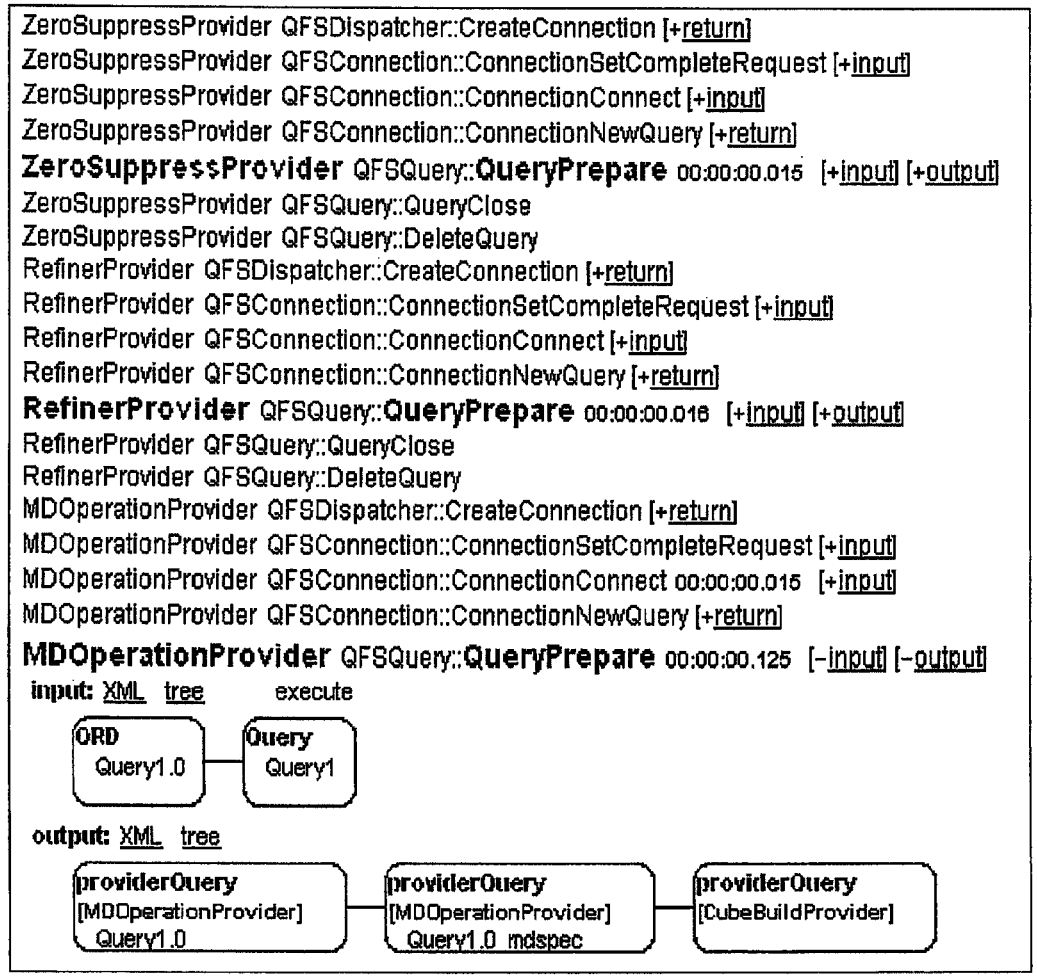
FIG. 14 is an example of a view of query results of a query framework query.
FIG. 15 is an example showing opening of a macro operation tree.

FIG. 13 also shows an example of an "execute" option that initiates execution of given QF query and switches to a view containing the query results once they are ready, as exemplified in FIG. 14. Viewing query results allows to understand better the semantics of queries passed to a given component. Another important application of this functionality is ability to verify intermediate results of physical operations in the execution plan.

Figure 16:
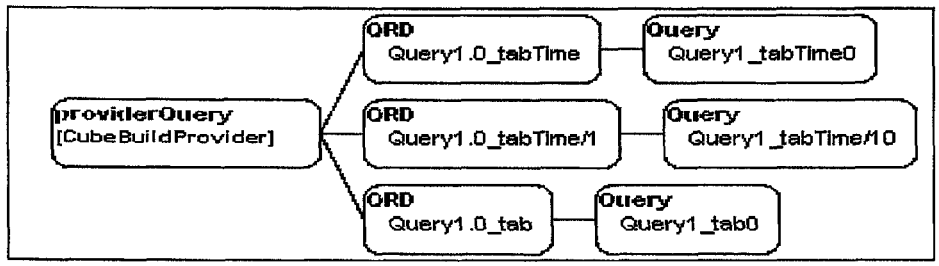
FIG. 16 is an example of a tree pattern of macro operations.
Figure 17:
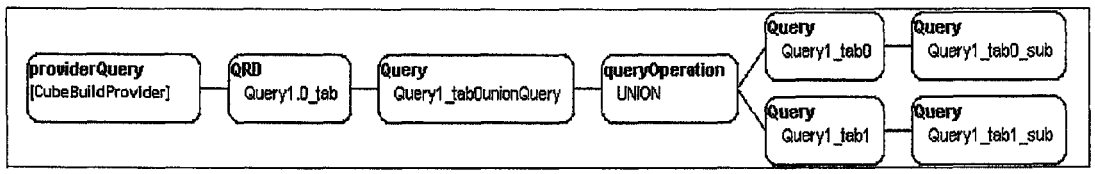
FIG. 17 is another example of a tree pattern of macro operations.
Figure 18:
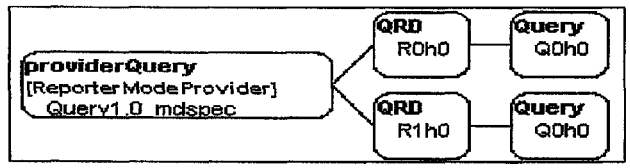
FIG. 18 is another example of a tree pattern of macro operations.

As exemplified in FIG. 15, visual inspection of a log file with opened blocks of macro operation tree transformations also lets a user identify the main query transformation patterns that a given request contains. For example the macro operation tree pattern shown in FIG. 16 indicates that a dynamic cube is populated from multiple data streams. The pattern shown in FIG. 17 is an example of an indicator of optimization of the tabular query populating a dynamic cube. Another example is the pattern shown in FIG. 18, which indicates that the query has a reporter mode operation.

Once a query is planned, a query execution plan is the final result of a query planning process. At this point a QF query representing the query execution plan consists of only physical macro operations that can be executed by query operation providers. The sequence of these operations in the macro operation tree determines the sequence of their invocation at the execution stage and the data flow from one operation to another. Physical macro operations are expressed with provider queries. Every provider query is associated with a certain provider responsible for the operation execution.

Thus, once a query is planned, the macro operation tree contains only providerQuery nodes. In an embodiment where the strategy of query planning is to push as much operations to underlying databases as possible, the main operations in this tree are relational query provider (RQP) operation based on SQL and OLAP query provider (OQP) operation based primarily on multidimensional expression (MDX). On its own these operations can be complex and contain a combination of operations that require better understanding. By presenting these operations as a macro operation tree, the visualization system 100 assists the user to understand and analyze the macro operations without the need of understanding of the query framework system 10.

Figure 19:
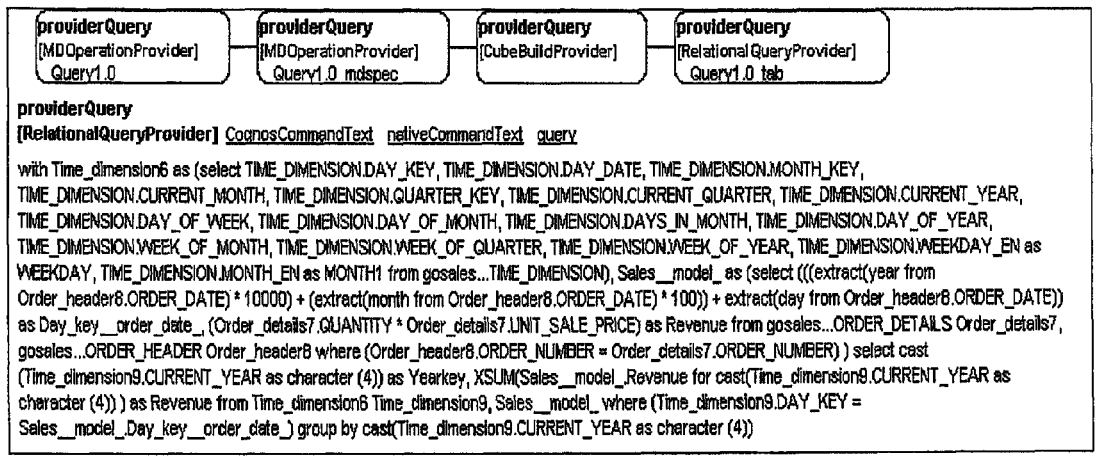
FIG. 19 is an example of macro operation details.
Figure 20:
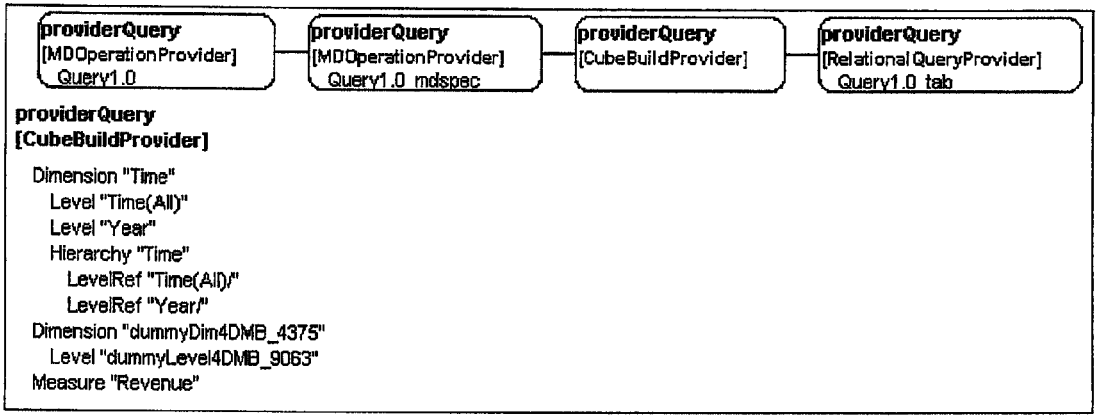
FIG. 20 is another example of macro operation details.
Figure 21:
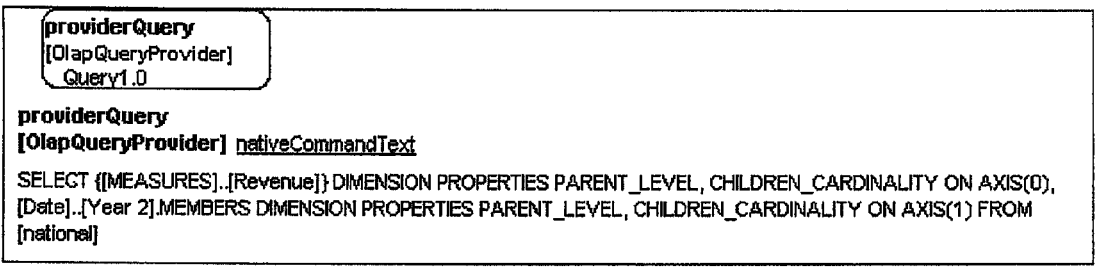
FIG. 21 is another example of macro operation details.

In general, most of macro operations have some internal structure that actually completes their definition. The macro operation tree handler 192 may also have a macro operation details handler 198 that exposes this structure in a format that can be understood by wide variety of potential users. For example, FIGS. 19-21 show examples of formats that the macro operation details handler 198 uses to represent details of RQP, OQP and CubeBuildProvider nodes. The visualization system 100 presents RQP operation details by SQL views, e.g., Cognos SQL, native SQL and the query framework query views, as exemplified in FIG. 19. The visualization system 100 presents a CubeBuildProvider operation by the structure of a dynamic cube built for a given query, as exemplified in FIG. 20. The visualization system 100 presents OQP operation details by generated native MDX, as exemplified in FIG. 21. The macro operation details handler 198 may provide other views, e.g., the view representing the result of a given operations to be able to check the data flows from one operation to another.

Figure 22:
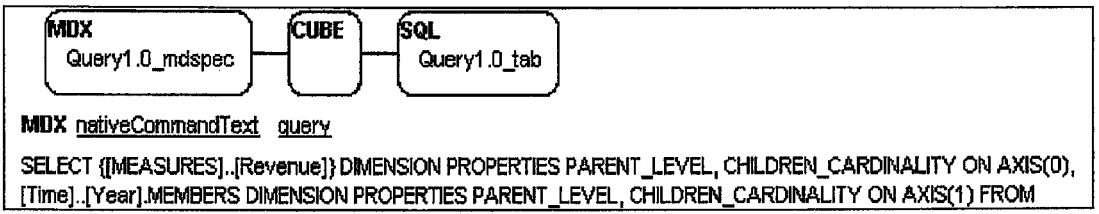
FIG. 22 is an example of a view of a query execution plan.

The visualization system 100 provides a query execution plan view that can be also suitably used by report authors. Exposing an execution plan to report authors may provide a significant insight of the nature of operations involved in a query/report processing, their performance and amount of data consumed at any given point of a query execution. Report authors are typically unfamiliar with the notion of query framework providers which requires understanding of internals of the query framework system 10 or query engine architecture. The visualization system 100 provides a view of the query execution plan that is represented through more widely known notions, e.g., SQL query specification, MDX query specification, and Cube creation operation. Hence, rather than using the notion of provider query in the execution plan visualization, the visualization system 100 marks macro operations using their main responsibility, or in other words gives a high level title or label for each macro operation that is intuitive for a report author. FIG. 22 shows an example of a view with such high level titles.

FIG. 23 is a diagram showing an example of a flow for requesting a view of an execution plan by a report author. The report author requests to view an execution plan in a data analyzing system 30. The data analyzing system 30 sends a validation request 200 to a report server 20. The report server 20 sends the translated XML API validation request 202 to the query framework system 10. The query framework system 10 processes the request and generates an execution plan, and returns to the report server 20 an XML API response 204 including the execution plan. The report server 20 translates it to a validation response 206 and returns it to the data analyzing system 30, which sends the execution plan 208 to the visualization module 140 of the query processing visualization system 100 for presenting it to the report author.

For example, the data analyzing system 30 uses a validation request, expressed in the format of a SOAP request. To indicate the request for the execution plan property, the data analyzing system 30 issues a SOAP validation request or command 200 with requestProperty=ExecutionPlan. The report server 20 translates the validation request 200 into a QF XML API request or command 202, as shown in FIG. 25, requesting messages at the "information" level of severity and also number of the request properties. The QF XML API request 202 includes <property name="QFExecutionPlan>. The set of request properties does not include the execution property of a request supported by QF XML API shown in FIG. 26.

The query framework system 10 processes the validation request and generates a QF XML API response 204 including <property name="QFExecutionPlan>. The report server 20 received it and translates it to a SOAP validation response 206 to the validation request asking for query information contains the details under <queryInfo> element, as shown in FIG. 27, where QUERY INFO is the string of encoded XML. The execution plan is part of this query info XML, as shown in FIG. 28.

The data analyzing system 30 receives the SOAP validation response 206 including the execution plan in XML in the original format of a tree of provider queries. This execution plan XML 208 is sent to the visualization module 140 of the query processing visualization system 100 that formats the execution plan XML and presents the formatted execution plan as described above. The visualization module 140 also provides query plan analysis functionality by supporting the dynamic properties of the execution plan visualization: folding and unfolding operation trees, opening the node property views and initiating the execution of the plan sub-trees.

The query processing visualization system of the present invention may be implemented by any hardware, software or a combination of hardware and software having the above described functions. The software code, either in its entirety or a part thereof, may be stored in a computer readable memory. Further, a computer data signal representing the software code which may be embedded in a carrier wave may be transmitted via a communication network. Such a computer readable memory and a computer data signal are also within the scope of the present invention, as well as the hardware, software and the combination thereof.

The present invention has been described with regard to one or more embodiments. However, it will be apparent to persons skilled in the art that a number of variations and modifications can be made without departing from the scope of the invention as defined in the claims.

What is claimed is:

1. A query processing visualization system comprising:
 a computer;
 a visualization module executable by the computer for visualizing logging information of query processing events occurring during processing of a client query requesting data from one or more data sources, the visualization module comprising:
  a logging information analyzer to analyze the logging information to identify one or more dependencies of the query processing events, analyze logging information of method calls corresponding to main query processing events, identify one or more dependencies of the method calls, and identify at least one recursive dependency of the method calls;
  an event sequence formatter to format visual presentation components representing the logging information in a hierarchy to reflect the one or more dependencies of the query processing events, format the visual presentation components in the hierarchy to reflect the one or more dependencies of the method calls, and format the visual presentation components representing recursively called method calls as collapsible components; and
  a method call presentation handler to present the visual presentation components in a context of the hierarchy of the visual components as formatted by the event sequence formatter, present the visual presentation components that represent method calls in the context of the hierarchy of the visual presentation components, and present the collapsible components such that methods at a given calling depth are visually presented.

2. The query processing visualization system as recited in claim 1, wherein the event sequence formatter includes a transforming method call handler that allows opening a tree of macro operations representing a method that has transformed a structure of the tree.

3. The query processing visualization system as recited in claim 1, wherein
 the logging information analyzer extracts logging information including event process information of a method call; and
 the method call presentation handler includes a process information adder for adding the process information to a visual component representing the method call.

4. The query processing visualization system as recited in claim 3, wherein the process information includes at least one of an elapse time and memory consumption of the method call.

5. The query processing visualization system as recited in claim 3, wherein the process information adder highlights the process information in the presentation.

6. The query processing visualization system as recited in claim 1, wherein the method call presentation handler comprises a component label handler to label a presentation component representing a method call by a name of the method, name of a container object and name of a service provider that provides a processing service of the method.

7. The query processing visualization system as recited in claim 1, wherein
 the logging information analyzer extracts logging information including parameter information of a method call; and
 the method call presentation handler includes a parameter information adder to add to a visual component representing the method call an access to the parameter information of the method call.

8. The query processing visualization system as recited in claim 7, wherein the parameter information adder adds at least one of an input parameter access, an output parameter access, and a return parameter access.

9. The query processing visualization system as recited in claim 7, wherein the parameter information handler includes a macro operation tree handler to present a tree of macro operations that represents a parameter containing a query framework query, the query framework query being executable by one or more query processing service providers of a query framework that processes the client query.

10. The query processing visualization system as recited in claim 9, wherein the macro operations include at least one of a query result definition, query and provider query.

11. The query processing visualization system as recited in claim 9, wherein the method call presentation handler includes an execute option handler to allow execution of the query framework query and to present a view containing query results of the execution.

12. The query processing visualization system as recited in claim 9, wherein the macro operation tree handler includes a macro operation details handler to expose a structure of the macro operations that completes definition of the macro operations in a format.

13. The query processing visualization system as recited in claim 1, wherein
the logging information analyzer extracts logging information of a query execution plan which is generated as a result of a query planning process, the query execution plan including macro operations that are executable by query processing service providers;
the event sequence formatter formats visual presentation components representing the executable macro operations to represent the query execution plan; and
the method call presentation handler presents the visual presentation components for validation of the execution plan.

14. The query processing visualization system as recited in claim 1 further comprising a logging module that comprises:
an event capturer to capture query processing events occurring during the processing of the client query;
a method call identifier to identify, as method calls, main query processing events among the captured query processing events; and
a logging element handler to log each method call as being represented by a logging element.

15. A method of visualizing query processing, the method comprising:
analyzing logging information of query processing events occurring during processing of a client query requesting data from one or more data sources so as to identify one or more dependencies of the query processing events;
analyzing logging information of method calls corresponding to main query processing events so as to identify one or more dependencies of the method calls and at least one recursive dependency of the method calls;
formatting visual presentation components representing the logging information of the query processing events in a hierarchy to reflect the one or more dependencies of the query processing events;
formatting the visual presentation components representing the logging information of the method calls in a hierarchy to reflect the one or more dependencies of the method calls;
formatting the visual presentation components representing recursively called method calls as collapsible components;
presenting the visual presentation components representing the logging information of the query processing events in a context of the hierarchy of the visual components;
presenting the visual presentation components that represent the method calls in the context of the hierarchy of the visual components; and
presenting the collapsible components such that methods at a given calling depth are visually presented,
wherein one or more of the analyzing, formatting, and presenting are performed by a computer.

16. The method as recited in claim 15, wherein presenting the visual presentation components that represent the method calls comprises allowing opening a tree of macro operations representing a method that has transformed a structure of the tree.

17. The method as recited in claim 15, wherein
analyzing the logging information of the method calls comprises extracting logging information including event process information of a method call; and
presenting the visual presentation components that represent the method calls comprises adding the process information to a visual component representing the method call.

18. The method as recited in claim 17, wherein presenting the visual presentation components that represent the method calls comprises adding at least one of an elapse time and memory consumption of the method call.

19. The method as recited in claim 15, wherein formatting the visual presentation components representing the logging information of the method calls comprises labeling a presentation component representing a method call by a name of method, name of container object and name of a service provider that provides a processing service of the method.

20. The method as recited in claim 15, wherein
analyzing the logging information of the method calls comprises extracting logging information including parameter information of a method call; and
presenting the visual presentation components that represent the method calls comprises adding an access to the parameter information of the method call to a visual component representing the method call.

21. The method as recited in claim 20, wherein adding the access to the parameter information comprises presenting a tree of macro operations that represents a parameter containing a query framework query, the query framework query being executable by one or more query processing service providers of a query framework that processes the client query.

22. The method as recited in claim 21, wherein presenting the tree of macro operations comprises providing an execute option to allow execution of the query framework query and to present a view containing query results of the execution.

23. The method as recited in claim 15, wherein
analyzing logging information of query processing events comprises obtaining logging information of a query execution plan which is generated as a result of a query planning process, the query execution plan consisting of macro operations that are executable by query processing service providers;
formatting the visual presentation components representing the logging information of query processing events comprises formatting visual presentation components representing the executable macro operations to represent the query execution plan; and
presenting the visual presentation components representing the logging information of the query processing events comprises presenting the visual presentation components representing the logging information of the query processing events for validation of the execution plan.

24. The method as recited in claim 15 further comprising obtaining the logging information by:
capturing query processing events occurring during the processing of the client query;
identifying, as method calls, main query processing events among the captured query processing events; and
logging each method call as being represented by a logging element.

25. A computer readable memory comprising instructions executable by a computer to:
analyze logging information of query processing events occurring during processing of a client query requesting data from one or more data sources so as to identify one or more dependencies of the query processing events;

analyze logging information of method calls corresponding to main query processing events so as to identify one or more dependencies of the method calls and at least one recursive dependency of the method calls;

format visual presentation components representing the logging information of the query processing events in a hierarchy to reflect the one or more dependencies of the query processing events;

format the visual presentation components representing the logging information of the method calls in a hierarchy to reflect the one or more dependencies of the method calls;

format the visual presentation components representing recursively called method calls as collapsible components;

present the visual presentation components representing the logging information of the query processing events in the context of the hierarchy of the visual components present the visual presentation components that represent the method calls in the context of the hierarchy of the visual components; and present the collapsible components such that methods at a given calling depth are visually presented.

* * * * *